(12) United States Patent
Biskeborn et al.

(10) Patent No.: US 7,874,507 B2
(45) Date of Patent: *Jan. 25, 2011

(54) TAPE TENSION MODULATION SYSTEM AND METHOD

(75) Inventors: Robert G. Biskeborn, Hollister, CA (US); W. Stanley Czamecki, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 71 days.

This patent is subject to a terminal disclaimer.

(21) Appl. No.: 12/124,703

(22) Filed: May 21, 2008

(65) Prior Publication Data

US 2008/0218905 A1    Sep. 11, 2008

Related U.S. Application Data

(63) Continuation of application No. 11/299,983, filed on Dec. 12, 2005, now Pat. No. 7,467,757.

(51) Int. Cl.
B65H 23/24    (2006.01)

(52) U.S. Cl. .............. 242/419.3; 242/420.5; 242/346.2; 242/615.12; 242/548

(58) Field of Classification Search .......... 242/419, 242/419.3, 420.5, 346, 346.2, 615, 615.12, 242/615.2, 548; 360/73.01, 73.03; 226/95, 226/190, 193
See application file for complete search history.

(56) References Cited

U.S. PATENT DOCUMENTS

| | | | |
|---|---|---|---|
| 3,231,668 A | 1/1966 | Nishiwaki et al. | |
| 3,375,963 A | 4/1968 | Wang et al. | |
| 4,336,900 A | 6/1982 | Pontoni | |
| 4,337,885 A | 7/1982 | Stahler | |
| 4,642,706 A | 2/1987 | Vollmann et al. | |
| 4,899,950 A | 2/1990 | Matsuzaki | |
| 5,088,172 A | 2/1992 | Daly | |
| 5,159,506 A | 10/1992 | Eino et al. | |
| 5,224,643 A | 7/1993 | Kojima et al. | |
| 5,513,817 A * | 5/1996 | Nelson et al. ............ 242/419.3 |
| 5,553,801 A | 9/1996 | Lee | |
| 5,570,831 A | 11/1996 | Takeda et al. | |

(Continued)

FOREIGN PATENT DOCUMENTS

EP    0289411 B1    11/1988

(Continued)

*Primary Examiner*—William A Rivera
(74) *Attorney, Agent, or Firm*—Walter W. Duft

(57) ABSTRACT

A system and method of modulating tape tension during operation of a tape drive data storage system in which a fixed position tape guide utilizes one or more drag elements to exert a control force on a tape medium that affects downstream tape tension. Drag elements that may be used include, but are not necessarily limited to, air ports that delivery positive or negative air pressure to the tape medium, skiving edge elements that are positionable into and out of engagement with the tape medium, and brakes or motors that engage the tape guide (if it is rotatably mounted) to control its rotational torque. A tension control circuit is used to vary the operation of the one or more drag elements. Signal inputs to the control circuit are provided by a tape tension sensor adjacent to or incorporated in the tape guide.

20 Claims, 10 Drawing Sheets

U.S. PATENT DOCUMENTS

| | | |
|---|---|---|
| 6,745,976 B1 | 6/2004 | Marion |
| 2001/0023906 A1 | 9/2001 | Saito et al. |

FOREIGN PATENT DOCUMENTS

| | | |
|---|---|---|
| JP | 62134844 A | 6/1987 |
| JP | 2007254 A | 1/1990 |
| JP | 2126455 A | 8/1991 |
| JP | 5-120763 A | 5/1993 |

\* cited by examiner

TAPE TENSION MODULATION SYSTEM AND METHOD

This application is a continuation under 35 U.S.C. 120 of application Ser. No. 11/299,983, filed Dec. 12, 2005, entitled "Tape Tension Modulation System And Method."

BACKGROUND OF THE INVENTION

1. Field of the Invention

This invention relates to tape drive data storage systems. More particularly, the invention is directed to the modulation of tape tension during tape drive operations to facilitate data read/write accuracy.

2. Description of the Prior Art

By way of background, during operation in a tape drive data storage apparatus, a tape medium is transferred back and forth between supply and take-up reels while data is read from or written to tape by one or more read/write heads. Typically, the tape medium and the supply reel are mounted inside a tape cartridge that is inserted into a slot in the tape drive so that the tape is in magnetic contact with the read/write heads. The tape is advanced past the read/write head(s) by means of a pair of motors, one for each reel, which drive the reels at a desired tape speed.

For optimum data transfer through the read/write head(s), the tape must be precisely moved through the tape path and across the read/write heads. For best performance, the tension on the tape must be very accurately controlled because improper tape tension can lead to unreliable positioning of the tape relative to the read/write head(s), which can produce low readback signal amplitude and poor data transfer reliability. Improper tape tension can also cause poor stacking on the reels which can result in damaged media and therefore data loss.

In light of the foregoing, all modern tape drive data storage devices implement some form of global tape tension control. In some drives, this is done by controlling the torques on the motors that drive the supply and takeup reels. In particular, increasing the motor torques (which generally oppose one another) tends to increase tape tension, and visa versa. Another tension control method is to employ a capstan and pinch roller and then to use the reel closest to the head to tension to the tape. There are also various passive tape path components, such as grooved rollers and edge guides, but these do not allow tape tension to be directly controlled.

A disadvantage of the foregoing tape tension modulation techniques is that their response time is relatively slow, such that they are not capable of implementing rapid tape tension adjustments in response to high bandwidth transient tape tension variations, as are often seen during tape drive operation. Accordingly, it is desired to have an improved design for modulating tape tension in a tape drive data storage system. What is particularly needed is a tape tension modulation system that is responsive to high bandwidth tape tension transients that are not amenable to control using traditional global tape tension modulation techniques.

SUMMARY OF THE INVENTION

The foregoing problems are solved and an advance in the art is obtained by a system and method of modulating tape tension during operation of a tape drive data storage system in which a fixed position tape guide utilizes one or more drag elements to exert a drag force that affects tape tension. According to one aspect of the invention, the tape guide has a tape bearing portion and the one or more drag elements are disposed on the tape bearing portion to adjust its friction coefficient relative to the adjacent tape medium. Drag elements that may be disposed on the tape bearing portion include, but are not necessarily limited to, air ports that are in fluid communication with a source of positive and/or negative air pressure, and skiving edge elements that are positionable into and out of engagement with the tape medium using air pressure, transducers or other actuating means. In another aspect of the invention, the tape guide is rotatable and the one or more drag elements are disposed on a fixed surface so as to engage the rotating tape guide and adjust its friction coefficient relative to the fixed surface. Drag elements that may be disposed on the fixed surface include, but are not necessarily limited to, brakes and motors. A tension control circuit is used to vary the operation of the one or more drag elements. Signal inputs to the control circuit are provided by a tape tension sensor adjacent to or incorporated in the tape guide.

BRIEF DESCRIPTION OF THE DRAWINGS

The foregoing and other features and advantages of the invention will be apparent from the following more particular description of preferred embodiments of the invention, as illustrated in the accompanying Drawings, in which:

FIGS. 12A, 12B and 12C are top views showing a tape modulation system in accordance with another exemplary embodiment of the invention;

DETAILED DESCRIPTION OF THE PREFERRED EMBODIMENT

Figure 1:
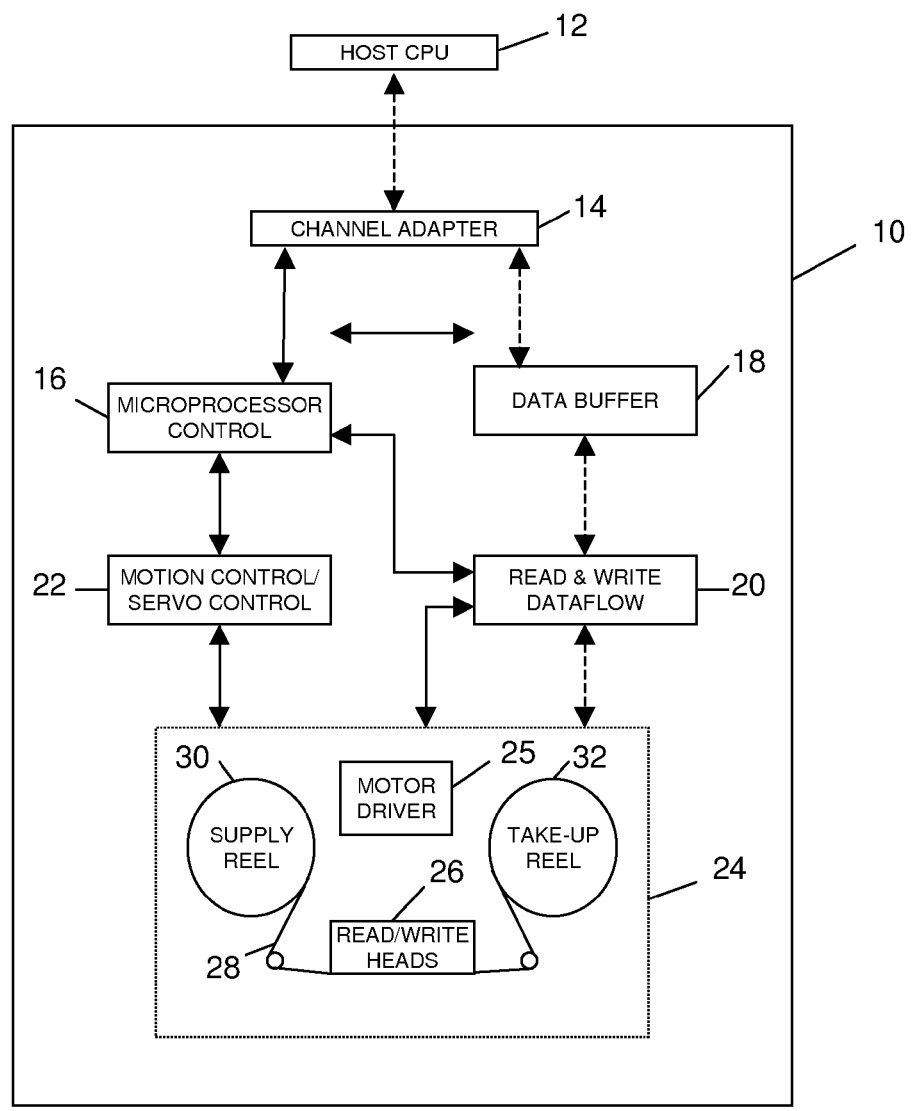
FIG. 1 is a functional block diagram showing a tape drive data storage device adapted for use with the present invention.

The invention will now be described by way of exemplary embodiments shown by the drawing figures (which are not necessarily to scale), in which like reference numerals indicate like elements in all of the several views.

Turning to FIG. 1, the inventive concepts herein described may be embodied in a tape drive data storage device (tape drive) 10 for storing and retrieving data by a host data processing device 12, which could be a general purpose computer or other processing apparatus adapted for data exchange with the tape drive 10. The tape drive 10 includes plural components providing a control and data transfer system for reading and writing host data on a magnetic tape medium. By way of example only, those components may conventionally include a channel adapter 14, a microprocessor controller 16, a data buffer 18, a read/write data flow circuit 20, a motion control system 22, and a tape interface system 24 that includes a motor driver circuit 25 and a read/write head unit 26.

The microprocessor controller 16 provides overhead control functionality for the operations of all other components of the tape drive 10. As is conventional, the functions performed by the microprocessor controller 16 are programmable via microcode routines (not shown) according to desired tape drive operational characteristics. During data write operations (with all dataflow being reversed for data read operations), the microprocessor controller 16 activates the channel adapter 14 to perform the required host interface protocol for receiving an information data block. The channel adapter 14 communicates the data block to the data buffer 18 that stores the data for subsequent read/write processing. The data buffer 18 in turn communicates the data block received from the channel adapter 14 to the read/write dataflow circuitry 20, which formats the device data into physically formatted data that may be recorded on a magnetic tape medium. The read/write dataflow circuitry 20 is responsible for executing all read/write data transfer operations under the control of the microprocessor controller 16. Formatted physical data from the read/write circuitry 20 is communicated to the tape interface system 24. The latter includes one or more read/write heads in the read/write head unit 26, and drive motor components (not shown) for performing forward and reverse movement of a tape medium 28 mounted on a supply reel 30 and a take-up reel 32. The drive components of the tape interface system 24 are controlled by the motion control system 22 and the motor driver circuit 25 to execute such tape movements as forward and reverse recording and playback, rewind and other tape motion functions. In addition, in multi-track tape drive systems, the motion control system 22 transversely positions the read/write heads relative to the direction of longitudinal tape movement in order to record data in a plurality of tracks.

Figure 2:
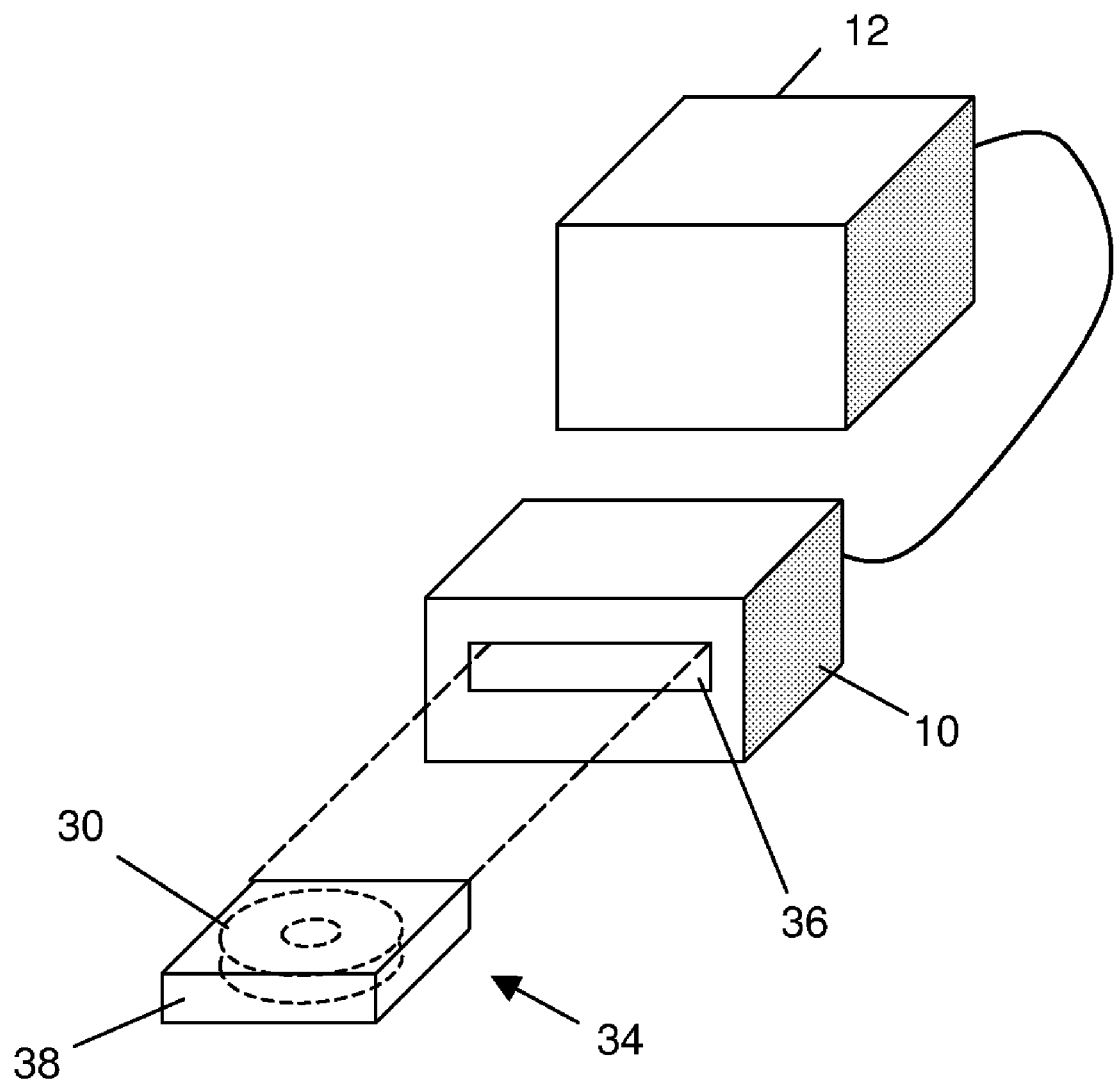
FIG. 2 is a perspective view showing an exemplary construction of the tape drive storage device of FIG. 1 for use with cartridge-based tape media.

In most cases, as shown in FIG. 2, the tape medium 28 will be mounted in a cartridge 34 that is inserted in the tape drive 10 via a slot 36 in the tape drive 10. The tape cartridge 34 comprises a housing 38 containing the magnetic tape 28. The supply reel 30 is shown to be mounted in the housing 38.

Figure 3:
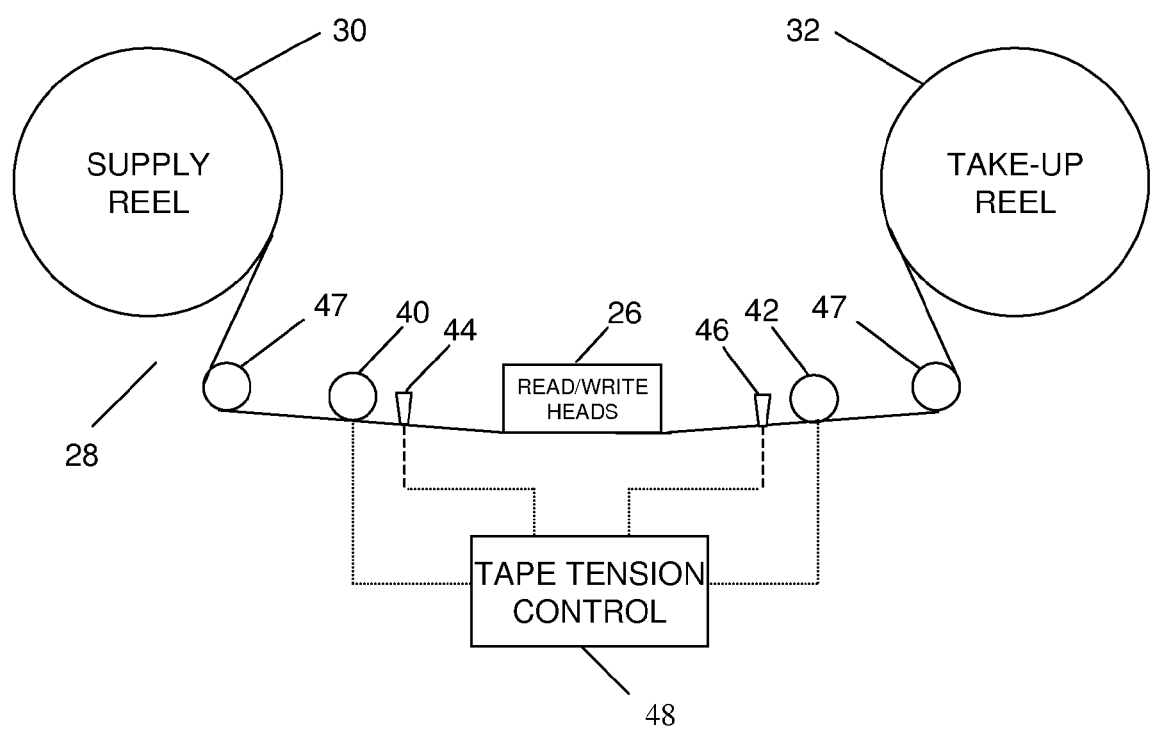
FIG. 3 is a functional block diagram showing tape path component details of the storage device of FIG. 1.

Referring now to FIG. 3, when the tape cartridge 34 is situated in its operational position within the tape drive 10, the tape medium 28 is brought into registered engagement with the read/write head unit 26 so that the tape is able to stream longitudinally over the face of the latter's read/write heads. The mechanism used to register the tape medium 28 in the required position is of conventional design, and will therefore not be described in further detail in the interest of brevity. Suffice it to say that the registration operation will also place the surface of the tape medium 28 in contact with a pair of tape guides 40 and 42, the former being situated between the read/write head unit 26 and the supply reel 30, and the latter being situated between the read/write head unit 26 and the take-up reel 32. If electromechanical tape tension sensing is used, a pair of tape tension sensors 44 and 46 may also be provided in the tape path. The tape tension sensors 44 and 46 could be positioned respectively adjacent to the tape guides 40 and 42 (as shown in FIG. 3), or they may be integrated therewith (not shown). A system of conventional guide rollers 47 may also be disposed in the tape path, according to conventional practice.

The tape guides 40 and 42 assist in guiding the tape medium 28 as it streams from the supply reel, past the read/write head unit 26, to the take-up reel 32. In addition, the tape guides 40 and 42 function in accordance with the present invention to perform tape tension modulation. In particular, as described in more detail below by way of several alternative embodiments, the tape guides 40 and 42 are constructed to act as high-bandwidth drag components for the tape path. Using low-mass, low-inertia design principles, the tape guides 40 and 42 are constructed to enable rapid actuation in response to random high-frequency tape tension transients. This approach is in contrast to conventional tape tension control elements, such as motor torque control systems, whose response time is slower due to the use of components having relatively high mass and moment of inertia.

The tape tension sensors 44 and 46 may be implemented using conventional tape tension sensing components, such as pressure sensors, etc. They are used to monitor tape tension and provide feedback signals that can be used to control the tape tension modulation produced by the tape guides 40 and 42. A tape tension control circuit 48 processes the feedback signals from the tape tension sensors 44 and 46 into tension control signals that are used to control the tape guides 40 and 42 to adjust tape tension. Often, only one of the tape guides 40 and 42 needs to perform tape tension modulation at any given time, depending on the direction of tape streaming. The tape guide 40 (along with its associated tape tension sensor 44) would normally function when the tape medium 28 is streaming from the supply reel 30 to the take-up reel 32. Conversely, the tape guide 42 (along with its associated tape tension sensor 46) would normally function when the tape medium 28 is streaming from the take-up reel 32 to the supply reel 30.

As an alternative to using the tape tension sensors 44 and 46 to provide tape tension information to the tension control system 48, the latter could be implemented in accordance with commonly owned U.S. Pat. No. 6,934,108, entitled "Servo Pattern Based Tape Tension Control For Tape Drives." This patent discloses the use of servo timing signals obtained from servo marks recorded on the tape medium to perform tape tension monitoring. It will thus be appreciated that the tape tension sensors 44 and 46 are merely optional within the context of the present invention.

Figure 4:
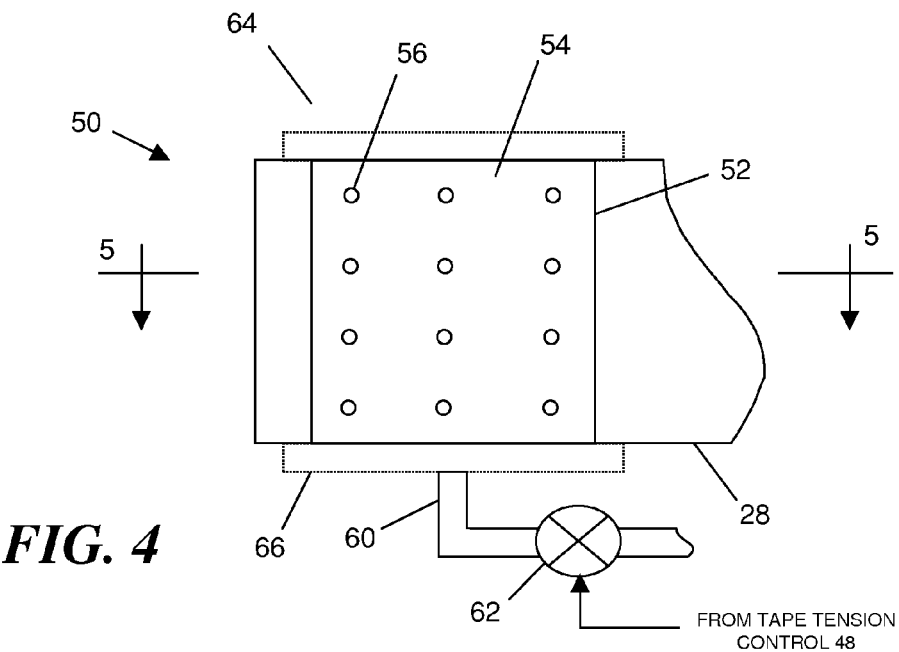
FIG. 4 is a side elevational view showing a tape tension modulating system in accordance with an exemplary embodiment of the invention (including portions that would ordinarily be hidden by the tape medium in contact therewith)
Figure 5A:
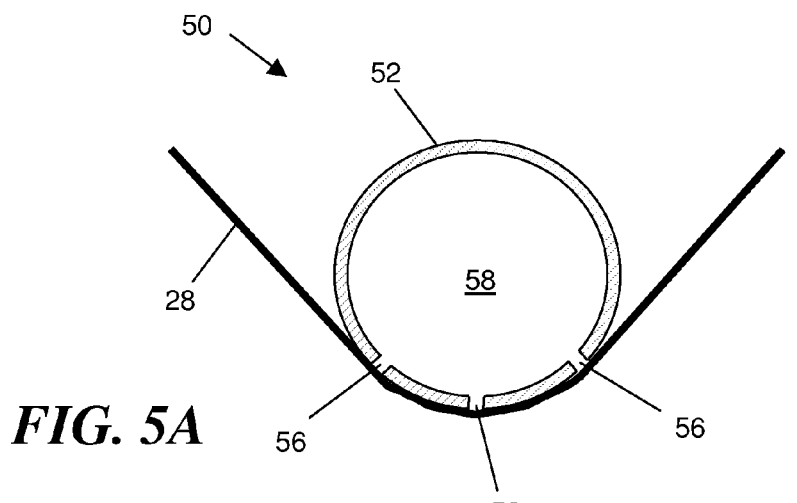
FIG. 5A is cross-sectional view taken along line 5-5 in FIG. 4 and showing the tape tension modulating system in a high tension mode.
Figure 5B:
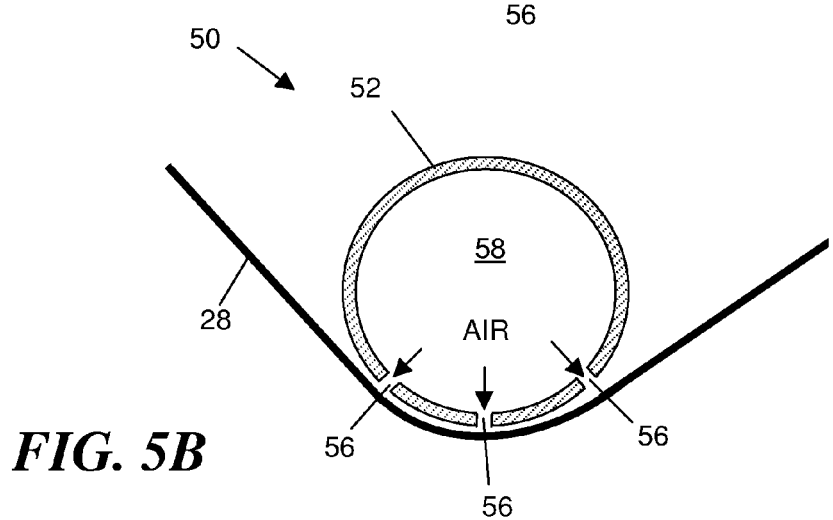
FIG. 5B is cross-sectional view taken along line 5-5 in FIG. 4 and showing the tape tension modulating system in a low tension mode.

FIGS. 4, 5A and 5B, illustrate one exemplary tape guide construction 50 that may be used to implement the tape guides 40 and 42 of FIG. 3. The construction 50 is formed with a main body 52 whose outer surface includes a tape bearing portion 54 having drag elements in the form of one or more air ports 56 of any desired shape and size. An air passage 58 is in fluid communication with the air ports 56. The air passage 58 extends through the main body 52 to an air line 60 that connects to an air pressure source 62. The air pressure source 62 is capable of producing a positive air pressure that directs air through the air passage 58 to the air ports 56, where it is emitted. In addition, the air pressure source 62 can also be constructed to produce a negative air pressure so as to generate a vacuum at the air ports 56. Control inputs to the air pressure source 62 will be provided by the tape tension control circuit 48 of FIG. 3.

In the configuration of FIGS. 4, 5A and 5B, the main body 52 is shown by way of example only as being a hollow cylinder that is intended to be fixed in position relative to the tape medium 28. A portion of the cylinder's outer surface is formed with plural holes of circular shape that provide the air ports 56, and its hollow interior provides the air passage 58. If desired, optional upper and lower flanges 64 and 66 can be added to the main body 52 to vertically constrain the tape medium 28 as it streams across the tape bearing portion 54. FIG. 4 also represents an exemplary configuration wherein the air pressure source 62 is implemented as an air pump. It will be appreciated that alternative means could be used to provide either positive or negative air pressure. For example, a switch could be controlled to connect the air line 60 to either an air pressure source or a vacuum source depending on whether positive or negative air pressure was required.

In operation, the tape medium 28 streams across the tape bearing portion 54 of the construction 50. If no positive air pressure is supplied to the air ports 56, or if a partial vacuum is applied thereto, the tape medium 28 will rub against the tape bearing portion. No air bearing can form to support the tape medium 28. Instead, higher friction will be created and increased tape tension will develop in the downstream tape path. This situation is shown in FIG. 5A. If positive air pressure is supplied to the air ports 56, the air flow through the air ports will displace the tape medium 28 away from the tape bearing portion, which will reduce the friction coefficient down to an asymptotic low level, and thereby decrease tape friction and downstream tape tension. This situation is shown in FIG. 5B. As discussed above, the tape tension control circuit 48 of FIG. 3 is used to apply control signals to the air pressure source 62 to adjust the air flow through the air ports 56, and thereby modulate tape tension in response to tape tension monitoring performed by the tape tension sensors 44 and 46, if present, or by other means. Conventional pneumatic control system components may be used to control the air pressure delivered by the air pressure source 62. Because such components are generally highly responsive, air pressure can be rapidly modulated, thereby allowing the tape guide 50 to function as a high bandwidth, tape path drag component.

Figure 5C:
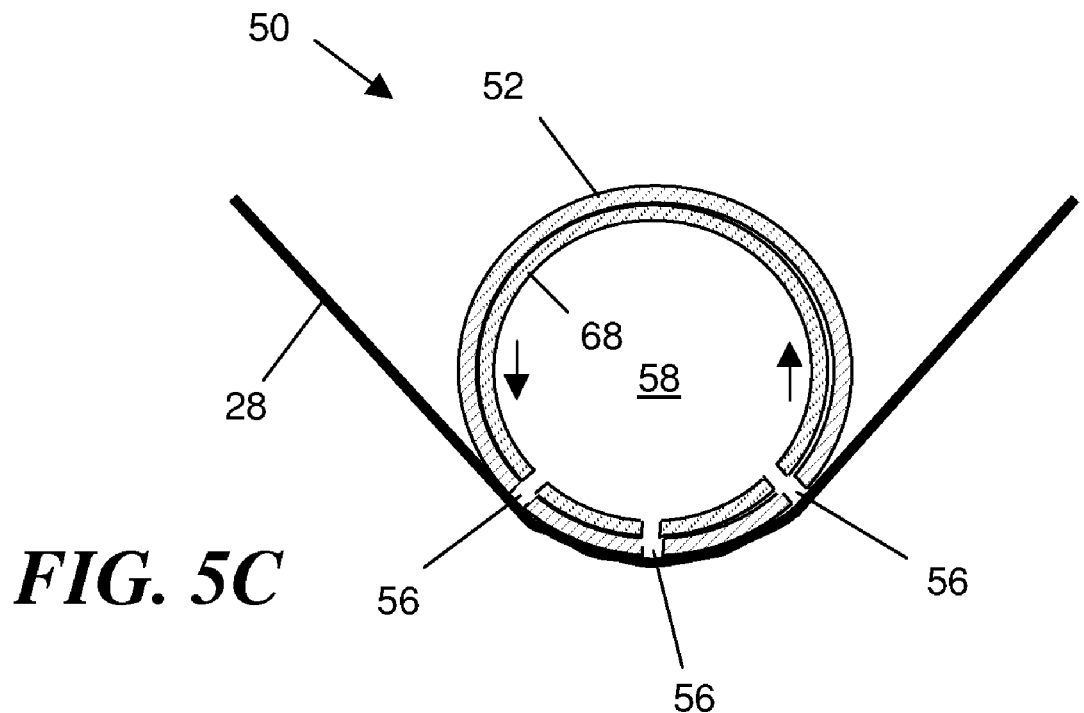
FIG. 5C is a cross-sectional view taken along line 5-5 in FIG. 4 and showing a modification of the tape tension modulating system of FIG. 5A.
Figure 5D:
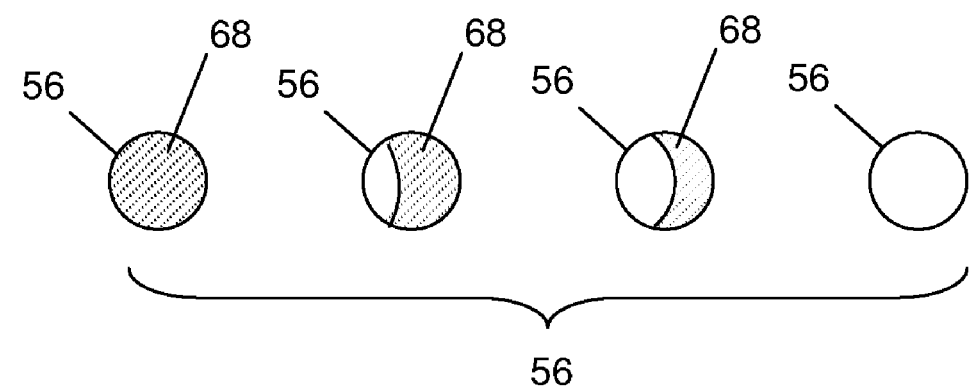
FIG. 5D is a side view showing a sequence of operational states of the tape tension modulating system of FIG. 5C.

In a modified version of the tape guide 50, shown in FIGS. 5C and 5D, an apertured shutter 68 of relatively low mass is slideably disposed within the air passage 58. The apertures of the shutter 68 are formed so they will line up with the air ports 56 when the shutter 68 is slid to an open position, thereby facilitating unrestricted air flow through the tape guide 50. To restrict the air flow, the shutter 68 is controllably slid to a closed position wherein the shutter completely blocks the air ports 56. FIG. 5D shows several exemplary shutter positions. Any suitable drive mechanism may be used to control the shutter, including a magnet and coil, a mechanical drive, etc. The low-mass, low-inertia construction of the shutter 68 allows it to be cycled very rapidly between its open and closed positions, thereby allowing the tape guide 50 to function as a high bandwidth, tape path drag component.

Figure 6:
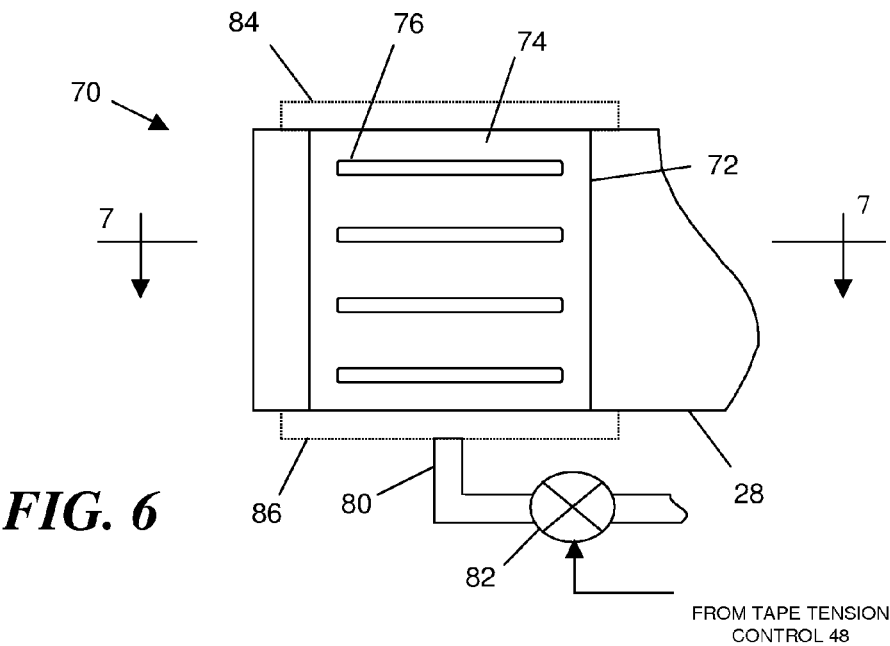
FIG. 6 is a side elevational view showing a tape tension modulating system in accordance with another exemplary embodiment of the invention (including portions that would ordinarily be hidden by the tape medium in contact therewith)
Figure 7A:
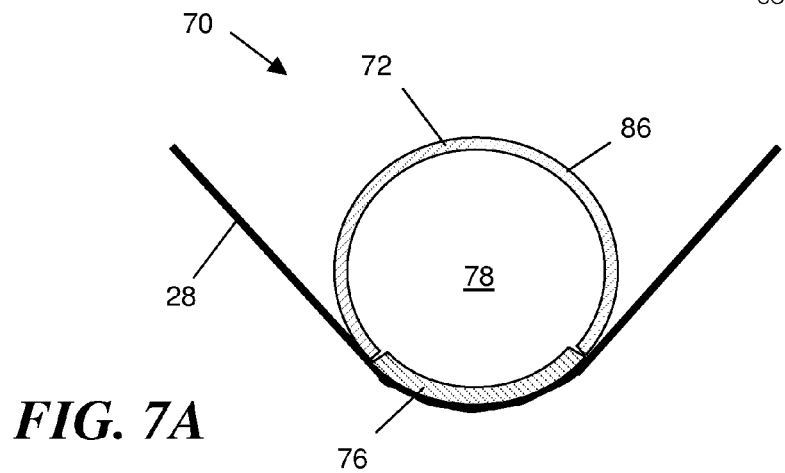
FIG. 7A is cross-sectional view taken along line 7-7 in FIG. 6 and showing the tape tension modulating system in a low tension mode.
Figure 7B:
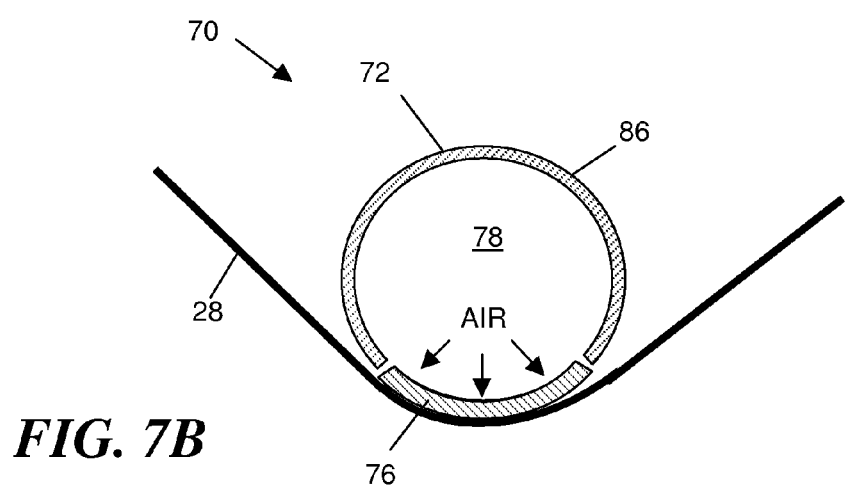
FIG. 7B is cross-sectional view taken along line 7-7 in FIG. 6 and showing the tape tension modulating system in a high tension mode.

Turning now to FIGS. 6, 7A and 7B, an alternative construction 70 that may be used to implement the tape guides 40 and 42 of FIG. 3 is shown. The construction 70 is similar in many respects to the construction 50 of FIGS. 4, 5A and 5B, as shown by the use of corresponding reference numerals (i.e., the reference numerals of the construction 50 incremented by 20). The principal distinguishing feature of the construction 70 relative to the construction 50 is that the latter does not use air ports as drag elements and instead has a set of edge elements 76 that protrude through elongated openings in the tape bearing portion 74. FIG. 7A shows the edge elements 76 in their retracted position with no air pressure applied by the air pressure source 82, or with a partial vacuum applied thereto. In this position, the tape medium 28 engages the surface of the tape bearing portion 74 with minimum tension in the downstream tape path due to the formation of an air bearing underneath the tape. FIG. 7B shows the edge elements 76 in their extended position as a result of positive air pressure applied by the air pressure source 82. The tape medium 28 is pushed out by the outer surfaces of the edge elements 76, and thus experiences an increase in friction and downstream tape tension as the air bearing is forced away by the edge elements and the tape experiences contact pressure. The edge elements 76 can be mounted to the main body 74 in any manner that allows them to extend and retract in response to air pressure (or direct mechanical actuation), and to be suitably retained in their respective openings in the tape bearing portion 74. Conventional pneumatic control system components may be used to control the air pressure delivered by the air pressure source 82. Because such components are generally highly responsive, air pressure can be rapidly modulated. This, coupled with the fact that the edge elements 76 are of low-mass, low-inertia construction, allows the tape guide 70 to function as a high bandwidth, tape path drag component.

Figure 8:
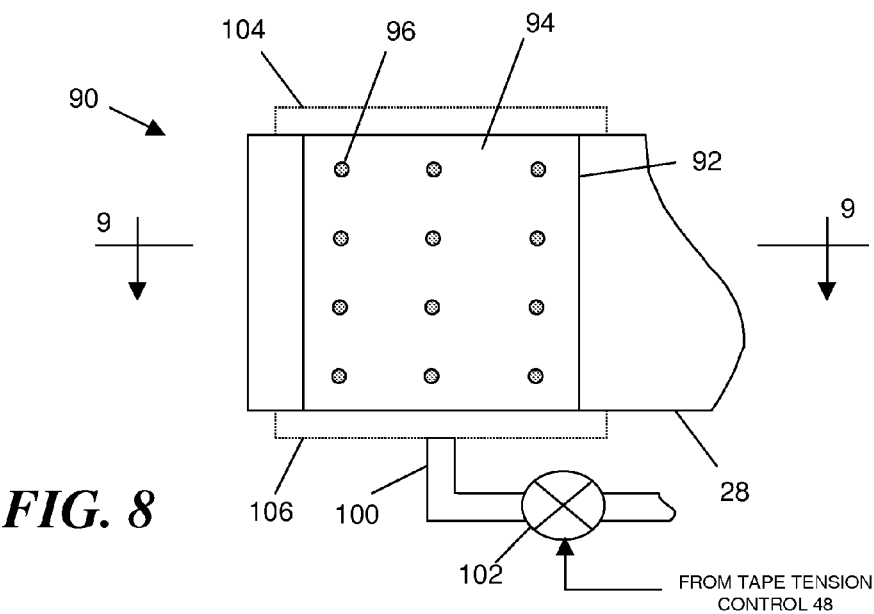
FIG. 8 is a side elevational view showing a tape tension modulating system in accordance with another exemplary embodiment of the invention (including portions that would ordinarily be hidden by the tape medium in contact therewith)
Figure 9A:
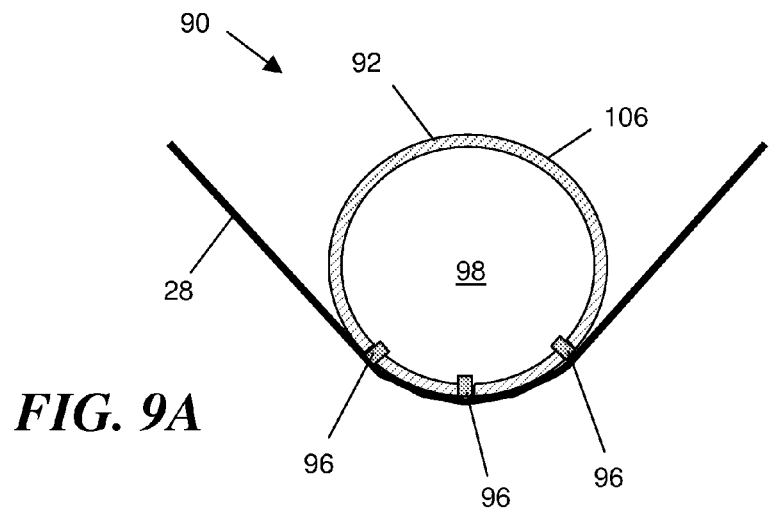
FIG. 9A is cross-sectional view taken along line 9-9 in FIG. 8 and showing the tape tension modulating system in a low tension mode.
Figure 9B:
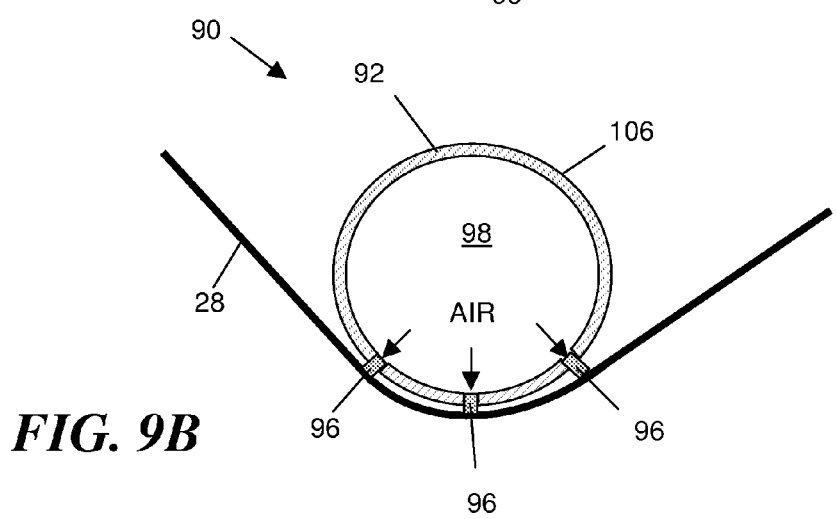
FIG. 9B is cross-sectional view taken along line 9-9 in FIG. 8 and showing the tape tension modulating system in a high tension mode.

Turning now to FIGS. 8, 9A and 9B, another alternative construction 90 that may be used to implement the tape guides 40 and 42 of FIG. 3 is shown. The construction 90 is similar in many respects to the construction 70 of FIGS. 4, 5A and 5B, as shown by the use of corresponding reference numerals (i.e., the reference numerals of the construction 50 incremented by 40). The principal distinguishing feature of the construction 90 relative to the construction 50 is that the latter does not use air ports as drag elements and instead has a set of skiving elements 96 that protrude through port openings in the tape bearing portion 94. FIG. 9A shows the elements 96 in their retracted position with no air pressure applied by the air pressure source 102, or with a partial vacuum applied thereto. In this position, the tape medium 28 engages the surface of the tape bearing portion 94 with minimum tension in the downstream tape path due to the formation of an air bearing underneath the tape. FIG. 9B shows the elements 96 in their extended position as a result of positive air pressure applied by the air pressure source 102. The tape medium 28 is pushed out by the outer tip surfaces of the elements 96, and thus experiences an increase in friction and downstream tape tension as the air bearing is skived away by the elements and the tape experiences contact pressure. Although not shown, the tips of some of the elements 96 can be tapered to provide upstream skiving edges when the tape medium 28 is moving in a first direction, while the tips of the remaining elements 96 can be tapered to provide upstream skiving edges when the tape medium is moving in the opposite direction. The elements 96 can be mounted to the main body 94 in any manner that allows them to extend and retract in response to air pressure (or direct mechanical actuation), and to be suitably retained in their respective openings in the tape bearing portion 94. Conventional pneumatic control system components may be used to control the air pressure delivered by the air pressure source 102. Because such components are generally highly responsive, air pressure can be rapidly modulated. This, coupled with the fact that the skiving elements 96 are of low-mass, low-inertia construction, allows the tape guide 90 to function as a high bandwidth, tape path drag component.

Figure 10:
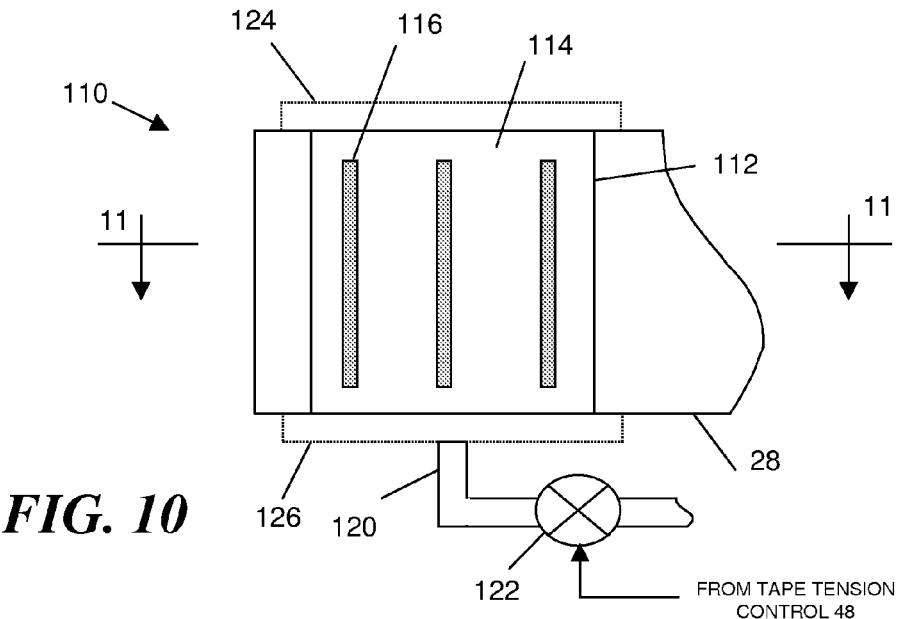
FIG. 10 is a side elevational view showing a tape tension modulating system in accordance with another exemplary embodiment of the invention (including portions that would ordinarily be hidden by the tape medium in contact therewith)
Figure 11A:
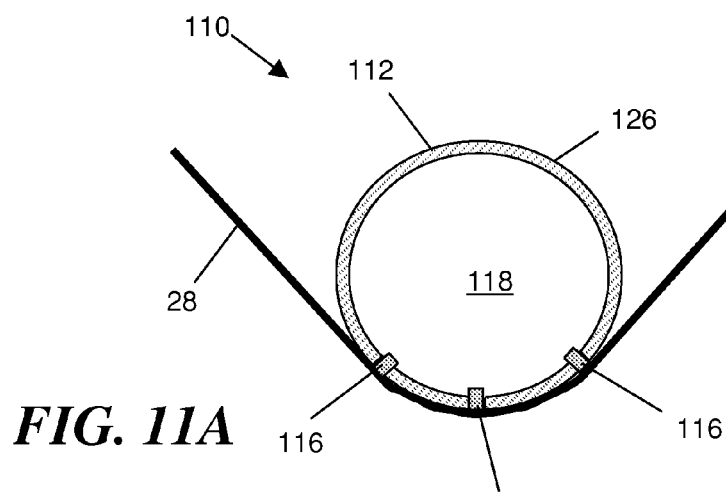
FIG. 11A is cross-sectional view taken along line 11-11 in FIG. 10 and showing the tape tension modulating system in a low tension mode.
Figure 11B:
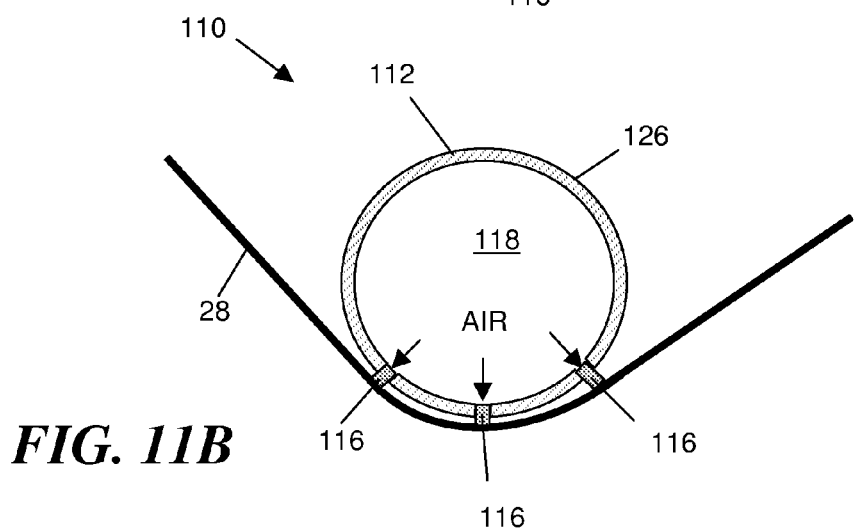
FIG. 11B is cross-sectional view taken along line 11-11 in FIG. 10 and showing the tape tension modulating system in a high tension mode.

Turning now to FIGS. 10, 11A and 11B, another alternative construction 110 that may be used to implement the tape guides 40 and 42 of FIG. 3 is shown. The construction 110 is similar in many respects to the construction 70 of FIGS. 6, 7A and 7B, as shown by the use of corresponding reference numerals (i.e., the reference numerals of the construction 70 incremented by 40). The principal distinguishing feature of the construction 110 relative to the construction 70 is that the skiving edge elements 116 that provide the drag elements are oriented parallel to the axis of the tape guide 110. FIG. 11A shows the edge elements 116 in their retracted position with no air pressure applied by the air pressure source 122, or with a partial vacuum applied thereto. In this position, the tape medium 28 engages the surface of the tape bearing portion 114 with minimum tension in the downstream tape path due to the formation of an air bearing underneath the tape. FIG. 11B shows the edge elements 116 in their extended position as a result of positive air pressure applied by the air pressure source 122. The tape medium 28 is pushed out by the outer surfaces of the edge elements 116, and thus experiences an increase in friction and downstream tape tension as the air bearing is skived away by the edge elements and the tape experiences contact pressure. Although not shown, the tips of some of the elements 116 can be tapered to provide upstream skiving edges when the tape medium 28 is moving in a first direction, while the tips of the remaining elements 116 can be tapered to provide upstream skiving edges when the tape medium is moving in the opposite direction. The edge elements 116 can be mounted to the main body 114 in any manner that allows them to extend and retract in response to air pressure (or direct mechanical actuation), and to be suitably retained in their respective openings in the tape bearing portion 114. Conventional pneumatic control system components may be used to control the air pressure delivered by the air pressure source 122. Because such components are generally highly responsive, air pressure can be rapidly modulated. This, coupled with the fact that the edge elements 116 are of low-mass, low-inertia construction, allows the tape guide 110 to function as a high bandwidth, tape path drag component.

Figure 12C:
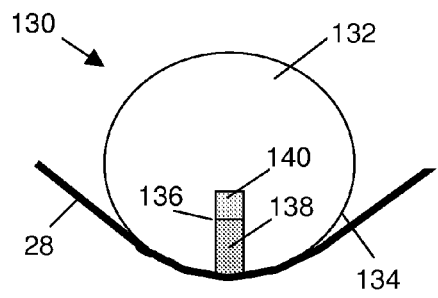
Figure 12C:
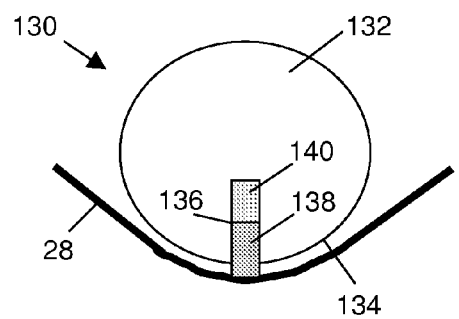
Figure 12C:
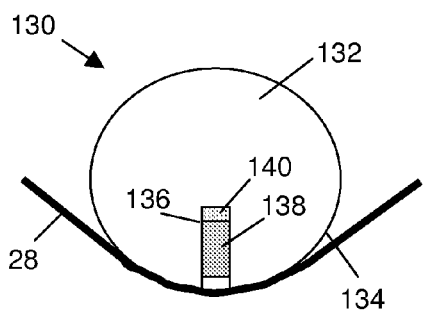

Turning now to FIGS. 12A, 12B and 12C, another alternative construction 130 that may be used to implement the tape guides 40 and 42 of FIG. 3 is shown. The construction 130 is formed with a generally cylindrical main body 132, the outer surface of which includes a tape bearing portion 134 having a slot 136 facing the tape medium 28. A drag element in the form of a skiving edge element 138 is slideably disposed in the slot 136. Its position can be adjusted by a piezoelectric transducer 140 disposed at the base of the slot 136. The transducer 140 moves the edge element 138 between the various positions shown in FIGS. 12A, 12B and 12C, allowing tape tension to be increased and decreased as desired. FIG. 12A shows the edge element 138 in a neutral position in which its outer surface is flush with the tape bearing portion 134. In this position, the tape medium 28 engages the surface of the tape bearing portion 134 and also the edge element 138 with minimum tension in the downstream tape path due to the formation of an air bearing underneath the tape. FIG. 12B shows the edge element 138 in an extended position as a result of expansion of the transducer 140. The tape medium 28 is pushed out by the outer surface of the edge element 138, and thus experiences an increase in friction and downstream tape tension as the air bearing is skived away by the edge element and the tape experiences contact pressure. FIG. 12C shows the edge element 138 in a retracted position as a result of contraction of the transducer 140. The tape medium 28 experiences an increase in downstream tape tension due to increased contact pressure as the air bearing is skived away by the slot 136. Control inputs to the transducer 140 will be provided by the tape tension control circuit 48 of FIG. 3. The low-mass, low-inertia construction of the edge element 138 allows it to be cycled very rapidly between its open and closed positions, thereby allowing the tape guide 130 to function as a high bandwidth, tape path drag component.

Figure 13:
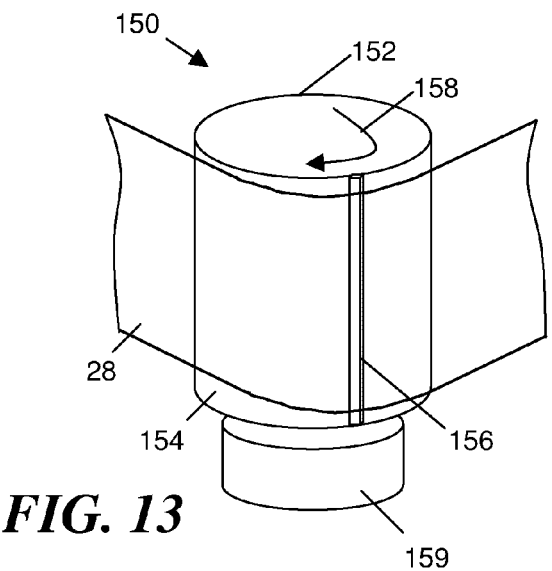
FIG. 13 is a perspective view showing a tape modulation system in accordance with another exemplary embodiment of the invention.

Turning now to FIG. 13, another alternative construction 150 that may be used to implement the tape guides 40 and 42 of FIG. 3 is shown. The construction 150 is formed with a generally cylindrical main body 152 having low mass and inertia, the outer surface of which includes a tape bearing portion 154 engaging the tape medium 28. A drag element in the form of a skiving edge element 156 is formed on the tape bearing portion 154. Its position can be adjusted by rotating the main body 152, as shown by the arrow 158. The rotation of the main body 152 can be performed with the aid of a servo motor or other high bandwidth actuating device 159. When the main body 152 rotated in a counterclockwise direction, the edge element 156 is in a non-engagement position in which it does not contact the tape medium 28. In this position, the tape medium 28 engages the surface of the tape bearing portion 154 with minimum tension in the downstream tape path due to the formation of an air bearing underneath the tape. When the main body 152 is rotated in a clockwise direction, the edge element 156 comes into contact with the tape medium 28, as shown in FIG. 13. The tape medium 28 is pushed out by the outer surface of the edge element 156, and thus experiences an increase in friction and downstream tape tension due to increased contact pressure as the air bearing is skived away by the edge element. Control inputs to the actuating device that rotates the main body 152 will be provided by the tape tension control circuit 48 of FIG. 3.

Because the main body 152 is constructed to minimize its mass and inertia, undesirable momentum effects that could reduce its responsiveness to rotational forces are avoided.

Reduced mass and inertia could be obtained, for example, by forming weight reducing pockets or apertures in the main body 152. Thus, the main body 152 can be rotated very rapidly, thereby allowing the tape guide 150 to function as a high bandwidth, tape path drag component.

Figure 14:
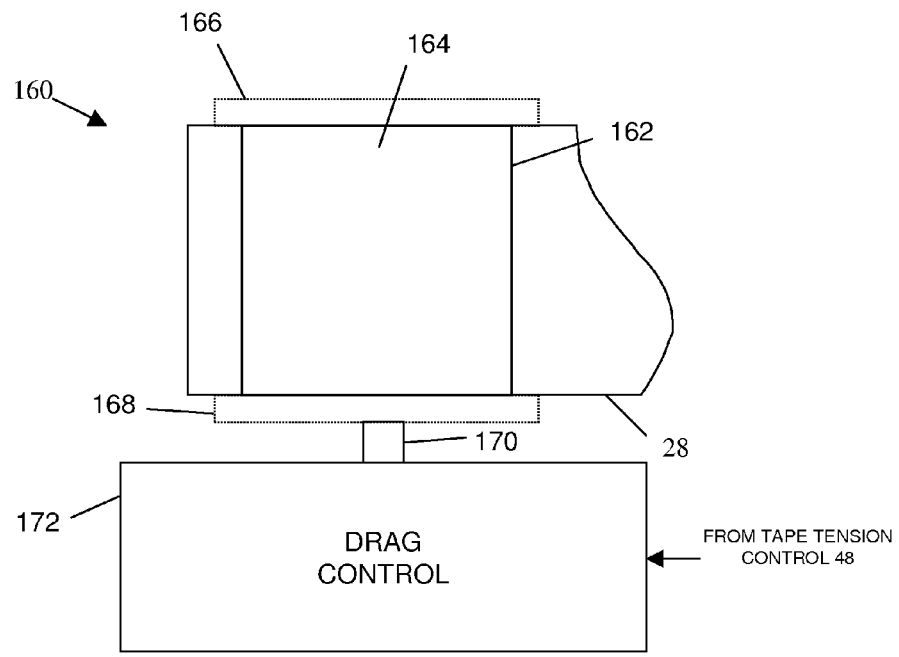
FIG. 14 is a side elevational view showing a tape tension modulating system in accordance with another exemplary embodiment of the invention (including portions that would ordinarily be hidden by the tape medium in contact therewith)

Turning now to FIG. 14, another alternative construction 160 that may be used to implement the tape guides 40 and 42 of FIG. 3 is shown. The construction 160 is formed with a generally cylindrical main body 162 of low mass and inertia, the outer surface of which includes a tape bearing portion 164. If desired, optional upper and lower flanges 166 and 168 can be added to the main body 162 to vertically constrain the tape medium 28 as it streams across the tape bearing portion 164. Unlike previous embodiments in which the tape medium 28 slides over one or more drag elements on a tape bearing surface to produce a variable drag or sliding friction coefficient, the main body 162 is adapted to rotate on a shaft 170 while engaging the tape medium. Tape tension is then adjusted by way of a drag element 172 that is adapted to control the rotational drag of the main body 162, thereby changing downstream tape tension. The drag element 172 may either be adapted to decrease or increase the torque on the main body 162, or both. To prevent slippage of the tape medium 28 relative to the tape guide 160, the tape bearing portion 164 can be formed with grooves or other tape gripping surface features.

Because the main body 162 is constructed to minimize its mass and inertia, undesirable momentum effects that could reduce its responsiveness to drag control forces are avoided. Reduced mass and inertia could be obtained, for example, by forming weight reducing pockets or apertures in the main body 162. Thus, the torque on the main body 162 can be modulated very rapidly, thereby allowing the tape guide 150 to function as a high bandwidth, tape path drag component.

Figure 15:
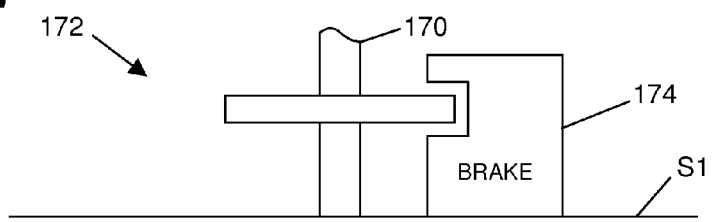
FIG. 15 is a side elevational view showing one exemplary rotational speed controller that may be used in the tape tension modulating system of FIG. 14.

FIG. 15 illustrates an exemplary construction of the drag element 172 in which a mechanical disk brake 174 mounted to a fixed surface S1 is positioned to engage a rotor 176 mounted on the shaft 170. Other brake designs could also be used, including but not limited to electromagnetic brakes provided that the brake is far enough removed from the tape medium 28 so as not to perturb the data thereon. Control inputs to the brake 174 will be provided by the tape tension control circuit 48 of FIG. 3.

Figure 16:
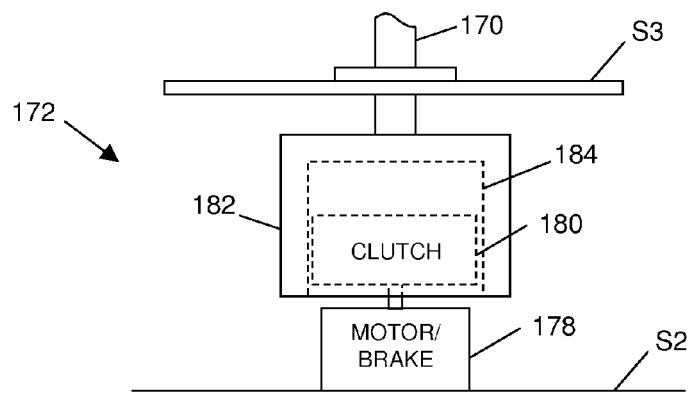
FIG. 16 is a side elevational view showing another exemplary rotational speed controller that may be used in the tape tension modulating system of FIG. 14.

FIG. 16 illustrates another exemplary construction of the drag element 172 in which a motor/brake 178 is mounted to a fixed surface S2. The motor/brake 178 drives a clutch 180 that is positioned to engage a drum 182 mounted on the shaft 170. The shaft 170 is mounted to a fixed surface S2. The clutch 180 is adapted to adjustably couple to an inner surface 182 of the drum 180. The torque on the main body 162, and thus the tape tension, will either be increased or decreased. Control inputs to the motor/brake 178 will be provided by the tape tension control circuit 48 of FIG. 3.

Accordingly, a system and method have been disclosed for modulating tape tension during operation of a tape drive data storage system in which the friction coefficient between a tape medium and a tape guide or between a fixed surface and a rotating tape guide is controlled to impart a drag force on the tape medium that affects downstream tape tension. While various embodiments of the invention have been shown and described, it should be apparent that many variations and alternative embodiments could be implemented in accordance with the teachings herein. For example, an embodiment of the invention could be located so that the position of a tape medium can be variably altered and its wrap angle around another tape path element substantially changed. This would change the tape friction across that element and thus control tape tension. It is understood, therefore, that the invention is not to be in any way limited except in accordance with the spirit of the appended claims and their equivalents.

What is claimed is:

1. In a tape drive, a tape tension modulation system for adjusting the tension of a tape medium in said tape drive comprising:
    a tape guide;
    said tape guide being fixed at a position in a tape path;
    a tape bearing portion on said tape guide adapted to engage a tape medium in said tape path;
    one or more drag elements operatively associated with said tape guide to exert a drag force that affects downstream tape tension;
    said one or more drag elements comprising any one of 1) not more than a single set of air ports on said tape guide in communication with a common air pressure source to change a friction coefficient of said tape bearing portion by selectively applying either positive or negative air pressure (but not both simultaneously) to said tape medium, 2) skiving edges on said tape guide in communication with an air pressure source to change a friction coefficient of said tape bearing portion by extending or retracting said edge members, 3) skiving edges on said tape guide controlled by transducers to change a friction coefficient of said tape bearing portion by moving into and out of engagement with said tape medium, 4) a brake adapted to slow rotation of said tape guide to increase downstream tension in said tape medium, and 5) a motor adapted to speed up rotation of said tape guide to decrease downstream tension in said tape medium;
    a tape tension control circuit for controlling operation of said one or more drag elements in order to alter tape tension during tape drive operations in response to changes in tape tension detected during said tape drive operations.

2. A tape drive in accordance with claim 1 wherein said one or more drag elements are disposed on said tape bearing portion to adjust a friction coefficient between said tape medium and said tape bearing portion.

3. A tape drive in accordance with claim 2 wherein said one or more drag elements comprise one or more air ports on said tape bearing portion in fluid communication with an air pressure source that delivers air pressure to said air ports.

4. A tape drive in accordance with claim 2 wherein said one or more drag elements comprise one or more skiving edge elements on said tape bearing portion in fluid communication with an air pressure source adapted to deliver air pressure to position said edge elements.

5. A tape drive in accordance with claim 2 wherein said one or more drag elements comprise one or more skiving edge elements on said tape bearing portion driven by transducers adapted to position said edge elements.

6. A tape drive in accordance with claim 2 wherein said one or more drag elements comprise a skiving edge element on said tape bearing portion and wherein said tape guide is operatively coupled to an actuator adapted to rotate said tape guide so that said edge element may contact said tape medium.

7. A tape drive in accordance with claim 1 wherein said tape guide is rotatable and said one or more drag elements are disposed on a fixed surface and engage said tape guide to adjust its friction coefficient relative to said fixed surface.

8. A tape drive in accordance with claim 7 wherein said one or more drag elements comprise a brake adapted to slow rotation of said tape guide.

9. A tape drive in accordance with claim 7 wherein said one or more drag elements comprise a motor adapted to speed up rotation of said tape guide.

10. A tape drive in accordance with claim 1 further comprising a tension sensor adapted to sense tape tension.

11. In a tape drive, a tape tension modulation system for adjusting the tension of a tape medium in said tape drive comprising:
- a tape guide;
- said tape guide being fixed at a position in a tape path;
- a tape bearing portion on said tape guide adapted to engage a tape medium in said tape path;
- one or more drag elements operatively associated with said tape guide to exert a drag force that affects downstream tape tension;
- a control circuit for controlling operation of said one or more drag elements in order to alter tape tension; and
- said tape guide being rotatable and said one or more drag elements being disposed on a fixed surface and engage said tape guide to adjust its friction coefficient relative to said fixed surface.

12. A tape drive in accordance with claim 11 wherein said one or more drag elements comprise a brake adapted to slow rotation of said tape guide.

13. A tape drive in accordance with claim 11 wherein said one or more drag elements comprise a motor adapted to speed up rotation of said tape guide.

14. In a tape drive, a tape tension modulation system for adjusting the tension of a tape medium in said tape drive comprising:
- a tape guide;
- said tape guide being fixed at a position in a tape path;
- a tape bearing portion on said tape guide adapted to engage a tape medium in said tape path;
- one or more drag elements operatively associated with said tape guide to exert a drag force that affects downstream tape tension;
- a control circuit for controlling operation of said one or more drag elements in order to alter tape tension;
- said one or more drag elements are disposed on said tape bearing portion to adjust a friction coefficient between said tape medium and said tape bearing portion; and
- said one or more drag elements comprising one or more skiving edge elements on said tape bearing portion.

15. A tape drive in accordance with claim 14 wherein said skiving edge elements are in fluid communication with an air pressure source adapted to deliver air pressure to position said edge elements.

16. A tape drive in accordance with claim 14 wherein said one or more skiving edge elements are driven by transducers adapted to position said edge elements.

17. A tape drive in accordance with claim 16 wherein said tape guide is operatively coupled to an actuator adapted to rotate said tape guide so that said one or more skiving edge elements may contact said tape medium.

18. In a tape drive, a tape tension modulation system for adjusting the tension of a tape medium in said tape drive comprising:
- a tape guide;
- said tape guide being fixed at a position in a tape path;
- a tape bearing portion on said tape guide adapted to engage a tape medium in said tape path;
- plural air ports on said tape bearing portion operative to deliver air pressure to said tape medium to control downstream tape tension;
- said plural air ports being the only air ports on said tape guide;
- a single air pressure source in fluid communication with each of said plural air ports, said air pressure source being operative to deliver positive or negative air pressure (but not both simultaneously) to each of said plural air ports; and
- a tape tension control circuit responsive to changes in tape tension during tape drive operations by controlling said air pressure delivered to said one or more air ports so that said one or more air ports operate in unison to alter said tape tension during said tape drive operations.

19. A tape drive in accordance with claim 18 wherein said air pressure source is operative to deliver only positive air pressure to said plural air ports.

20. A tape drive in accordance with claim 18 wherein said air pressure source is operative to deliver only negative air pressure to said plural air ports.

* * * * *